(12) United States Patent
Sanda et al.

(10) Patent No.: US 10,123,438 B1
(45) Date of Patent: Nov. 6, 2018

(54) ELECTRONIC APPARATUS AND METHOD OF MANUFACTURING SAME

(71) Applicant: OMRON Corporation, Kyoto (JP)

(72) Inventors: Takaaki Sanda, Fukuchiyama (JP); Makoto Sugimoto, Ayabe (JP); Daisuke Inoue, Ayabe (JP); Yusuke Hayashi, Kameoka (JP); Yuki Ushiro, Ayabe (JP); Hiroto Katsura, Ayabe (JP); Naomi Uehara, Ayabe (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/584,028

(22) Filed: May 2, 2017

(51) Int. Cl.
| | |
|---|---|
| *H05K 5/02* | (2006.01) |
| *H05K 5/06* | (2006.01) |
| *H01B 7/00* | (2006.01) |
| *H01B 7/02* | (2006.01) |
| *G01V 3/10* | (2006.01) |
| *H01B 3/44* | (2006.01) |
| *H01B 3/30* | (2006.01) |

(52) U.S. Cl.
CPC ............ *H05K 5/0247* (2013.01); *G01V 3/10* (2013.01); *H01B 7/0009* (2013.01); *H01B 7/02* (2013.01); *H05K 5/0217* (2013.01); *H05K 5/064* (2013.01); *H01B 3/30* (2013.01); *H01B 3/302* (2013.01); *H01B 3/443* (2013.01)

(58) Field of Classification Search
CPC .. H01R 13/5845; H01R 13/5205; H01B 3/30; H01B 7/0009; H01B 7/02; H01B 3/302; H01B 3/443; H02G 15/013; H02G 15/04; H05K 5/0247; H05K 5/064; G01V 3/10
See application file for complete search history.

(56) References Cited

U.S. PATENT DOCUMENTS

2017/0290180 A1* 10/2017 Kume .................. H05K 5/0247

FOREIGN PATENT DOCUMENTS

| EP | 2919567 A1 * | 9/2015 | ......... H03K 17/9505 |
|---|---|---|---|
| JP | 2009-043429 | 2/2009 | |
| JP | 2009043429 A * | 2/2009 | |
| JP | 2015-177042 | 10/2015 | |

* cited by examiner

*Primary Examiner* — James Wu
(74) *Attorney, Agent, or Firm* — JCIPRNET

(57) ABSTRACT

To provide an electronic apparatus which enables manufacturing costs to be reduced and a range of selection of materials for resin components to be widened. An electronic apparatus includes a case, a cable drawn out from the case, a bonding intermediating member that is made of a resin and joined to the cable, a cylindrical clamp holding the cable, and a sealing resin part filling an internal space defined by the case and the clamp. The cable has a core wire and a sheath that is made of a resin covering the core wire and the core wire is exposed not to be covered by the sheath at an end of the cable. The bonding intermediating member has a cylindrical base covering an outer circumferential face of the sheath and an extension part extending from the base and bonding to the sealing resin part. The bonding intermediating part is fixed to the cable by welding the base onto the sheath.

5 Claims, 11 Drawing Sheets

ELECTRONIC APPARATUS AND METHOD OF MANUFACTURING SAME

BACKGROUND OF THE INVENTION

Field of the Invention

The present invention relates to a manufacturing method of an electronic apparatus and an electronic apparatus, and particularly to a manufacturing method of an electronic apparatus and an electronic apparatus whose internal space of a case is sealed with a resin and in which a cable is drawn out from an inside to outside of the case.

Description of Related Art

In a specific electronic apparatus, an internal space of a case that houses electronic components is sealed with a resin in order to secure environmental resistance of the electronic apparatus. In this case, a problem of how a power supply cable for supplying power, a signal cable for connecting to an external terminal, or the like is drawn out from an inside of the case of the electronic apparatus while securing environmental resistance arises.

In general, a cable such as the above-described power supply cable or signal cable is designed to be held by an elastically deformable clamp that fits into an opening provided in a case to alleviate stress exerted on the cable. In the configuration in which the cable is merely held by the clamp, however, a bonding force between the cable and a sealing resin part which seals an internal space of the case may not be sufficient, and thus separation may occur in a connection section thereof, which worsens environmental resistance consequently.

For that reason, various methods for improving a bonding force between a cable and a sealing resin part have been reviewed, and for example, Japanese Unexamined Patent Application Publication No. 2015-177042 (Patent Document 1) and Japanese Unexamined Patent Application Publication No. 2009-43429 (Patent Document 2) disclose technologies for proximity sensors that detect presence/absence or a position of a metal object using a magnetic field to improve a bonding force between a cable and a sealing resin part provided in the proximity sensors.

In the proximity sensor disclosed in Patent Document 1, a ring cord formed of a polybutylene terephthalate (PBT) resin is formed through insert molding so as to cover an end of a cable formed of a polyvinyl chloride (PVC) resin, a sealing resin part is formed with the ring cord press-fitted into a clamp, and thereby the ring cord ensures a bonding force between the cable and the sealing resin part.

In addition, in the proximity sensor disclosed in Patent Document 2, a two-color molding member formed of a polyurethane (PUR) resin and a PBT resin is formed through insert molding so as to cover an end of a cable, a protrusion having an inverted truncated cone shape is provided at a tip of the two-color molding member, a sealing resin part is formed with the two-color molding member press-fitted into a clamp, and thereby the two-color molding member ensures a bonding force between the cable and the sealing resin part.

PRIOR ART DOCUMENTS

Patent Documents

[Patent Document 1] Japanese Unexamined Patent Application Publication No. 2015-177042

[Patent Document 2] Japanese Unexamined Patent Application Publication No. 2009-43429

SUMMARY OF THE INVENTION

Problem to be Solved by the Invention

However, when the configurations disclosed in Patent Document 1 and Patent Document 2 are adopted, it is necessary to form the above-described ring cord or two-color molding member at an end of a cable using insert molding, and thus molds appropriate for various specifications need to be prepared or molding conditions need to be variously modified. Thus, there has been a demand for suppressing manufacturing costs required for insert molding as much as possible in recent years.

In addition, even when the configurations as disclosed in Patent Document 1 and Patent Document 2 are adopted, it may be hard to say that sufficient environmental resistance is secured in a relatively harsh environment. For example, in an environment in which a temperature significantly changes as time elapses and a large amount of oil such as cutting oil is used, there is concern of damage such as separation occurring in a connection section of the case and the cable even when the above-described configuration is adopted.

In order to solve the problem, using a material having excellent oil resistance for the above-described ring cord or two-color molding member may be considered, however, materials of that kind are not suitable for insert molding in many cases.

Therefore, the present invention has been conceived to solve the above-described problems and aims to provide a manufacturing method of an electronic apparatus and an electronic apparatus which enable manufacturing costs to be reduced and a range of materials for various resin components selected to improve environmental resistance to be widened.

Technical Means Solving the Problem

A manufacturing method of an electronic apparatus according to the present embodiment is a manufacturing method of an electronic apparatus that has a case having an opening, an electronic component housed in the case, a cable whose one end is inserted into the opening to be electronically connected to the electronic component and the other end is drawn outside, a bonding intermediating member that is made of a resin and joined to the cable, a cylindrical clamp that fits into the opening and holds the cable when the bonding intermediating member fits into the clamp, and a sealing resin part that fills an internal space defined by the case and the clamp. The manufacturing method of an electronic apparatus according to the present invention includes a step of manufacturing the bonding intermediating member so as to have a cylindrical base and an extension part extending from the base; a step of joining the bonding intermediating member to the one end side of the cable so that an outer circumferential face of a sheath is covered by the base and the extension part extends from the base toward the one end side of the cable; a step of fixing the bonding intermediating member to the cable by welding the base onto the sheath; and a step of filling the internal space defined by the case and the clamp with the sealing resin part to bond the sealing resin part to the extension part of the bonding intermediating member.

Since the bonding intermediating member can be easily fixed to the cable by welding the bonding intermediating member onto the sheath as described above, manufacturing costs can be reduced and a range of materials for various resin components selected to improve environmental resistance can be widened.

In the manufacturing method of an electronic apparatus according to the present invention, a thickness of the portion of the base to be welded onto the sheath before the welding is preferably a value in the range of 0.3 mm to 0.5 mm.

By setting the thickness of the portion of the base of the bonding intermediating member to be welded onto the sheath before the welding to a value in the range of 0.3 mm to 0.5 mm, the portion can be reliably welded and a sealing property of the portion can be secured.

In the manufacturing method of an electronic apparatus according to the present invention, the sealing resin part is preferably formed of one of an epoxy resin and a polyurethane resin, the bonding intermediating member is preferably formed of one of a polybutylene terephthalate resin, a polyurethane resin, a nylon-based resin, and a fluorine-based resin, and the sheath is preferably formed of one of a polyvinyl chloride resin, a polyurethane resin, and a fluorine-based resin.

In the manufacturing method of an electronic apparatus according to the present invention, the sealing resin part, the bonding intermediating member, and the sheath formed of various resins can be used.

An electronic apparatus according to the present invention includes a case having an opening; an electronic component housed in the case; a cable whose one end is inserted into the opening to be electronically connected to the electronic component and the other end is drawn outside; a bonding intermediating member that is made of a resin and joined to the cable; a cylindrical clamp that fits into the opening and holds the cable when the bonding intermediating member fits into the clamp; and a sealing resin part that fills an internal space defined by the case and the clamp. The cable has a core wire including a conductive wire and a sheath that is made of a resin covering the core wire, the core wire is exposed at the one end side of the cable without being covered by the sheath, the bonding intermediating member has a cylindrical base covering an outer circumferential face of the sheath and an extension part extending from the base toward the one end side of the cable and being bonded to the sealing resin part. In the electronic apparatus according to the present invention, the bonding intermediating member is fixed to the cable by welding the base onto the sheath.

Since the bonding intermediating member can be easily fixed to the cable by welding the bonding intermediating member onto the sheath as described above, manufacturing costs can be reduced and a range of materials for various resin components selected to improve environmental resistance can be widened.

In the electronic apparatus according to the present invention, the sealing resin part is preferably formed of one of an epoxy resin and a polyurethane resin, the bonding intermediating member is preferably formed of one of a polybutylene terephthalate resin, a polyurethane resin, a nylon-based resin, and a fluorine-based resin, and the sheath is preferably formed of one of a polyvinyl chloride resin, a polyurethane resin, and a fluorine-based resin.

In the electronic apparatus according to the present invention, the sealing resin part, the bonding intermediating member, and the sheath formed of various resins can be used as described above.

Effects of the Invention

According to the present invention, it is possible to provide a manufacturing method of an electronic apparatus and an electronic apparatus that enable manufacturing costs to be reduced and a range of materials for various resin components selected to improve environmental resistance to be widened.

DESCRIPTION OF THE EMBODIMENTS

Figure 1:
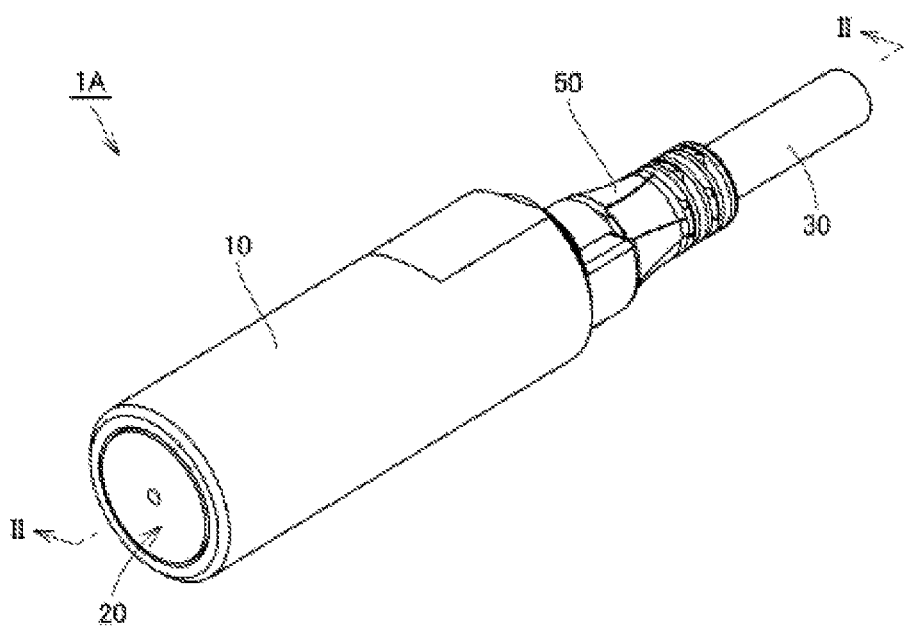
FIG. 1 is a perspective view of a proximity sensor according to Embodiment 1 of the present invention.

Exemplary embodiments of the present invention will be described in detail hereinbelow with reference to the diagrams. Applications of the present invention to proximity sensors and manufacturing methods thereof will be exemplified in the following embodiments. Note that the same parts or common parts in the following embodiments will be given the same reference numerals in the drawings, and description thereof will not be repeated.

Embodiment 1

Figure 2:
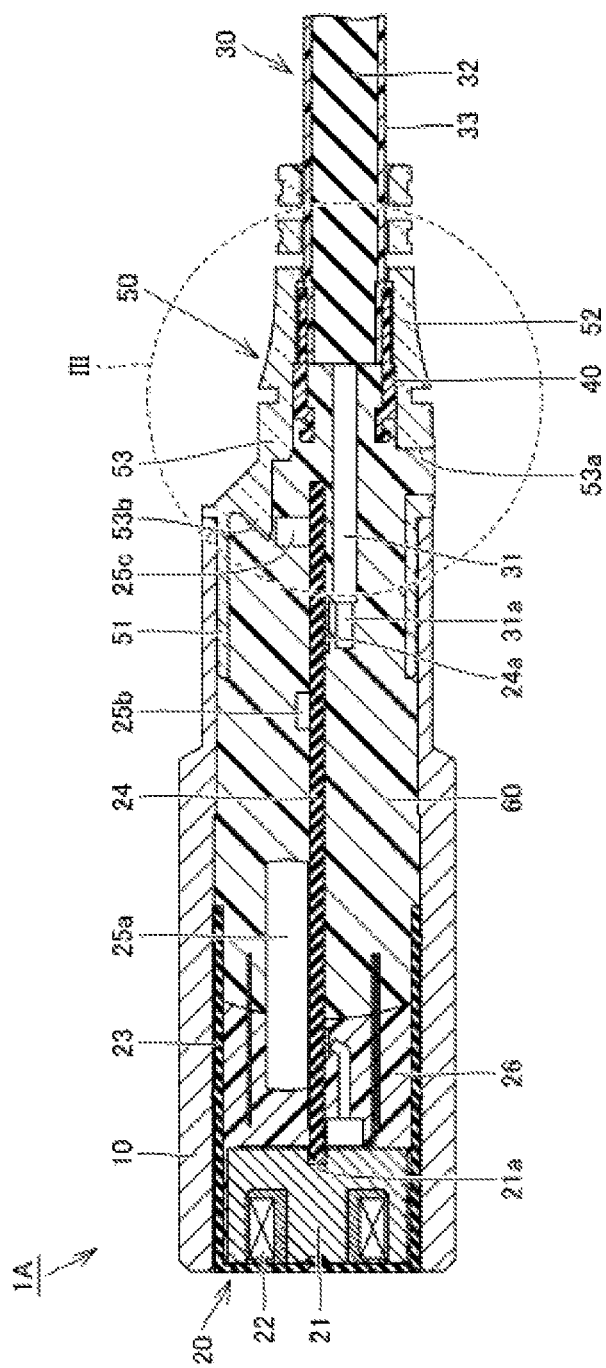
FIG. 2 is a cross-sectional view taken along line II-II shown in FIG. 1.
Figure 3:
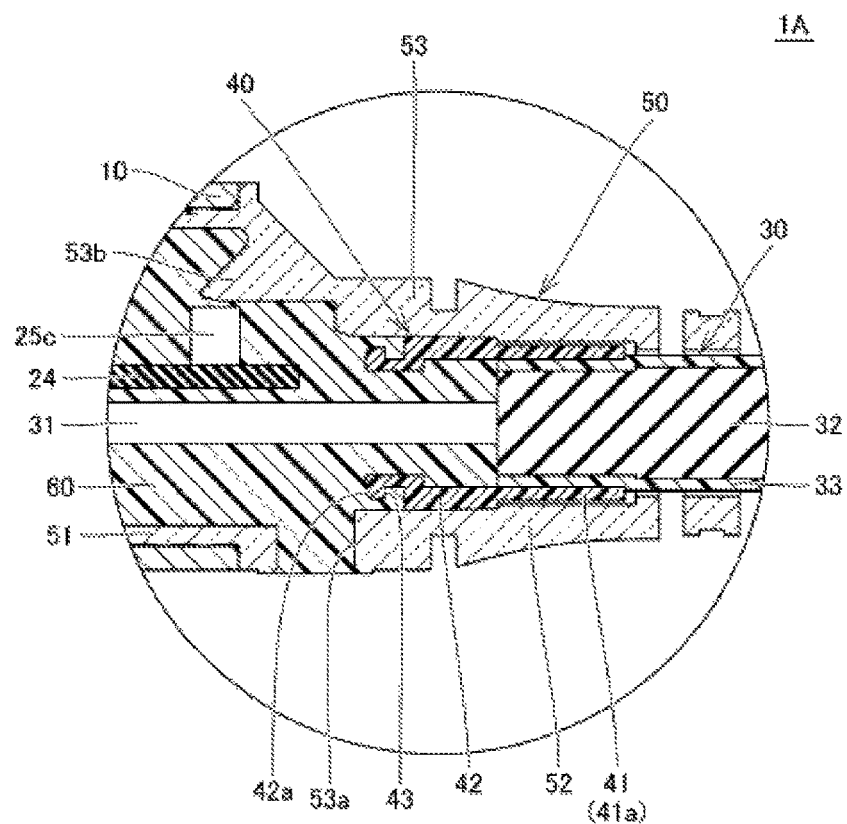
FIG. 3 is an enlarged cross-sectional view of area III shown in FIG. 2.
Figure 4:
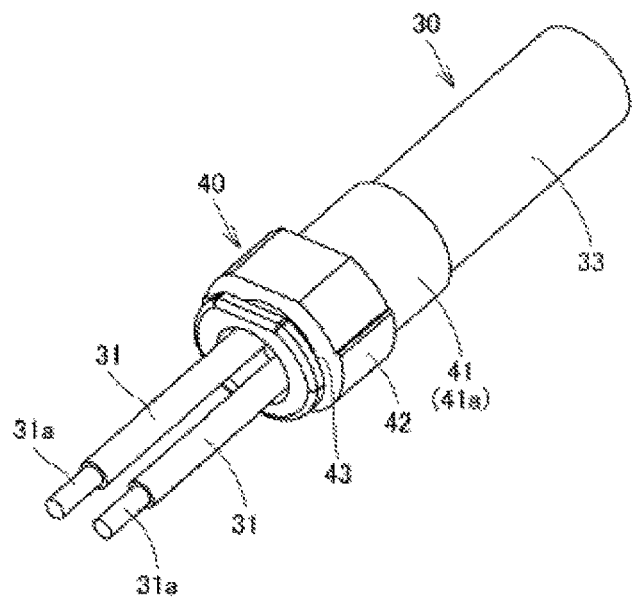
FIG. 4 is a schematic perspective view of a cable shown in FIG. 1 and a bonding intermediating member fixed thereto.

FIG. 1 is a perspective view of a proximity sensor according to Embodiment 1 of the present invention, and FIG. 2 is a cross-sectional view taken along line II-II shown in FIG. 1. In addition, FIG. 3 is an enlarged cross-sectional view of area III shown in FIG. 2, and FIG. 4 is a schematic perspective view of a cable shown in FIG. 1 and a bonding intermediating member fixed thereto. First, a configuration of the proximity sensor 1A of the present embodiment will be described with reference to FIGS. 1 to 4.

The proximity sensor 1A that is an electronic apparatus in the present embodiment has a substantially columnar outer shape and includes a case 10, a detector assembly 20 including a first sealing resin part 26, a cable 30, a bonding intermediating member 40, a clamp 50, and a second sealing resin part 60 as shown in FIGS. 1 and 2.

The case 10 is formed of a long cylindrical metallic member whose both ends are open, having a front end and a rear end in an axial direction. The front end of the case 10 has the detector assembly 20 assembled thereinto, and the rear end of the case 10 has the clamp 50 assembled thereinto.

The detector assembly 20 primarily has a core 21, a detection coil 22, a coil case 23, a circuit board 24, and the first sealing resin part 26 as shown in FIG. 2.

The core 21 is formed of a short columnar member formed of a magnetic material. The detection coil 22 is configured to have a substantially cylindrical shape by winding, for example, a lead wire, and housed in annular recesses provided on a front end face of the core 21. Note that a rear end face of the core 21 has a support groove 21a which supports a tip of the circuit board 24.

The coil case 23 is formed of a bottomed cylindrical insulating member and houses the core 21 and the detection coil 22 therein. The front end face of the core 21 abuts on a bottom of the coil case 23. The coil case 23 is press-fitted into and fixed to the case 10 so that the bottom thereof is positioned at the front end of the case 10.

The circuit board 24 is disposed behind the core 21 to extend in the axial direction of the case 10. The circuit board 24 has a conductive pattern formed on front and back surfaces thereof, and various electronic components 25a to 25c are mounted at predetermined positions on the front and back surface. The circuit board 24 is electrically connected to the detection coil 22 via a pin placed at ends of the detection coil 22.

Here, the electronic component 25c mounted at a rear end of the circuit board 24 among the various electronic components 25a to 25c mounted on the circuit board 24 is a light emitting element that emits light by an electric current being caused to pass therethrough. The light emitting element emits light in accordance with operation states of the proximity sensor 1A, and is configured with, for example, a light emitting diode (an LED).

The circuit board 24 has a variety of processing circuits formed thereon. The processing circuits include an oscillator circuit which uses the detection coil 22 as a resonant circuit element and a discriminator circuit which compares an oscillation amplitude of the oscillator circuit to a threshold value and generates binary data. The circuit board 24 also includes an output circuit which converts an output of the discriminator circuit into a voltage output or a current output having a predetermined specification and a power source circuit which converts power introduced from outside into power having a predetermined power specification and outputs the power. Moreover, the circuit board 24 also includes a light emitting element drive circuit which controls driving of the electronic component 25c that is the above-described light emitting element.

These various circuits are constituted by the conductive pattern provided on the circuit board 24, the above-described various electronic components 25a to 25c and the detection coil 22.

The first sealing resin part 26 seals the core 21 and the detection coil 22 and a front end of the circuit board 24 housed in the coil case 23. The first sealing resin part 26 not only protects the core 21, the detection coil 22, and the front end of the circuit board 24 but also seals them air-tightly and liquid-tightly from outside.

The first sealing resin part 26 is formed by injecting a liquid resin into the coil case 23 and then curing it. Note that, for example, an epoxy resin, a PUR resin, or the like can be preferably used as a material of the first sealing resin part 26.

A land 24a to which a conductive wire 31a, which is included in a core wire 31 of the cable 30 that will be described below, is connected is provided at a predetermined position on the rear end of the circuit board 24. For example, soldering, which is not illustrated, is used to connect the land 24a to the conductive wire 31a.

The cable 30 is configured to be a composite cable constituted by the core wire 31 including the conductive wire 31a, and a shielding material 32 and a sheath 33 covering the core wire 31. The cable 30 is disposed to be inserted into an opening provided at the rear end of the case 10, one end thereof is electrically connected to the above-described various circuits by connecting to the circuit board 24, and the other end thereof is drawn outside. Note that the sheath 33 is made of a resin, and more preferably one of a PVC resin, a PUR resin, and a fluorine-based resin.

Here, the shielding material 32 and the sheath 33 are peeled off at the above-described one end of the cable 30 to expose the core wire 31, and a covering material of the core wire 31 is peeled off as well at the part of the core wire 31 that is connected to the land 24a to further expose the conductive wire 31a.

As shown in FIGS. 2 to 4, the bonding intermediating member 40 is a member for securing a bonding property between the cable 30 and the second sealing resin part 60, and is assembled at an end of the sheath 33 positioned at the above-described one end side of the cable 30.

The bonding intermediating member 40 has a cylindrical base 41 that covers an outer circumferential face of the end of the sheath 33 positioned at the above-described one end side of the cable 30 in an internal space defined by the case 10 and the clamp 50 and a cylindrical extension part 42 extending in the direction of the one end of the cable 30 away from the end of the sheath 33 positioned at the one end of the cable 30. The bonding intermediating member 40 is joined to the cable 30 so that at least a part of the bonding intermediating member 40 goes into the internal space defined by the case 10 and the clamp 50. More specifically, the extension part 42 is positioned closer to the one end side of the cable than the end of the sheath 33 positioned at the one end side of the cable 30 and protrudes to extend in an extending direction of the cable 30. The cylindrical extension part 42 includes a relatively thick portion positioned at its base side and a sufficiently thin portion at its tip side. Note that, the bonding intermediating member 40 is made of a resin, and more preferably one of a PBT resin, a PUR resin, a nylon-based resin, and a fluorine-based resin.

Here, an outer shape of the extension part 42 is configured to be smaller than an outer shape of the portion of the extension part 42 at its base side and an outer shape of the base 41 when the extension part is viewed in the extending direction of the cable 30 in the present embodiment. Due to this configuration, a configuration of the clamp 50, which will be described below, can be simplified, and accordingly, an outer shape of a connection section of the cable 30 with respect to the case 10 can be miniaturized.

The welded part 41a is formed in the base 41. The welded part 41a is a portion formed by fixing the bonding intermediating member 40 to the cable 30 using welding. As described above, the bonding intermediating member 40 is fixed to the cable 30 so as not to be movable by welding the base 41 onto the sheath 33.

A groove 43 extending in a circumferential direction of the extension part 42 is provided at a predetermined position on an outer circumferential face at the tip side of the extension part. The groove 43 is an uneven part provided to increase a bonding force between the second sealing resin part 60, which will be described below, and the bonding intermediating member 40, and a so-called anchoring effect is gained by providing the groove 43 in the extension part 42, which enhances the bonding force. Note that the anchoring effect is that a bonding force is enhanced by providing an uneven part in a bonding face that serves as an angularity.

The clamp 50 has a substantially cylindrical shape and the cable 30 is inserted thereinto as shown in FIGS. 2 and 3. The clamp 50 fits into the opening provided at the rear end side of the case 10, and the above-described bonding intermediating member 40 fits into a rear end of the clamp 50, and thereby the cable 30 is held. The clamp 50 is formed of an elastically deformable resin member and alleviates stresses exerted on the cable 30 and the bonding intermediating member 40.

More specifically, the clamp 50 includes a cylindrical fixing part 51 positioned at a front end of the clamp, a substantially cylindrical holding part 52 positioned at a rear end of the clamp, and a connecting part 53 that is positioned between the fixing part 51 and the holding part 52 to connect the fixing part 51 to the holding part 52.

The fixing part 51 is a portion for fixing the clamp 50 to the case 10 when the fixing part is press-fitted into the opening provided at the rear end of the case 10. The holding part 52 is a portion for holding the bonding intermediating member 40 when the bonding intermediating member 40 is press-fitted thereinto. In addition, the connecting part 53 is a portion for improving the function of alleviating stress exerted on the cable 30 and the bonding intermediating member 40 by ensuring a distance between the fixing part 51 and the holding part 52 to be a predetermined distance.

Furthermore, a gate 53a that is used when a liquid resin that forms the second sealing resin part 60 is injected to fill the internal space defined by the case 10 and the clamp 50 with the second sealing resin part 60 is provided at a predetermined position on the connecting part 53.

Note that the clamp 50 is formed of a non-light shielding resin material in the present embodiment. The reason for this is that light emitted from the electronic component 25c serving as the light emitting element is projected to the outside via the clamp 50, and thus a light guiding part 53b having a predetermined shape is provided in a portion of the fixing part 51 facing the light emitting element.

The second sealing resin part 60 fills the internal space defined by the case 10 and the clamp 50 excluding a space sealed by the above-described first sealing resin part 26. Accordingly, the portion of the circuit board 24 excluding the above-described front end thereof, the various electronic components 25a to 25c that are mounted in that portion, and the portion of the core wire 31 that is not covered by the sheath 33 of the cable 30 are sealed by the second sealing resin part 60.

The second sealing resin part 60 protects and air-tightly and liquid-tightly seals the portion of the circuit board 24 excluding the above-described front end thereof, the various electronic components 25a to 25c that are mounted in that portion, and the portion of the core wire 31 that is not covered by the sheath 33 of the cable 30 from outside.

The second sealing resin part 60 is formed by injecting a liquid resin through the gate 53a of the clamp 50 as described above and curing the resin. Note that, for example, an epoxy resin, a PUR resin, or the like can be preferably used as a material of the second sealing resin part 60.

Here, the extension part 42 of the bonding intermediating member 40 is bonded to the second sealing resin part 60, and an inner circumferential face, an outer circumferential face, and an end face of the extension part at the tip side of the extension part 42 in an axial direction are all covered by the second sealing resin part 60 at the tip side as shown in FIG. 3. Thus, a stronger bonding force between the cable 30 and the second sealing resin part 60 can be secured in the proximity sensor 1A according to the present embodiment than in a proximity sensor of the related art, and a mechanism thereof will be described below in detail.

Figure 5:
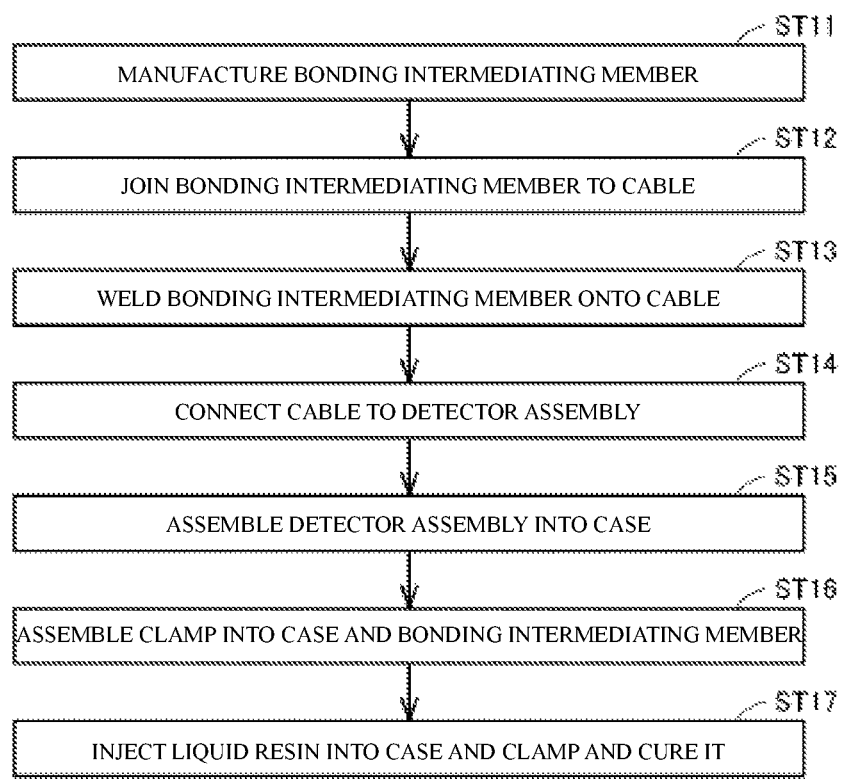
FIG. 5 is a flowchart for describing a manufacturing method of the proximity sensor according to Embodiment 1 of the present invention.

FIGS. 5 and 6 each are a flowchart and an assembly diagram for describing a manufacturing method of the proximity sensor according to the present embodiment. Next, the manufacturing method of the proximity sensor according to the present embodiment will be described with reference to FIGS. 5 and 6.

First, the bonding intermediating member 40 is manufactured as described in FIG. 5 (Step ST11). More specifically, the bonding intermediating member 40 is formed such that the cylindrical base 41 and the cylindrical extension part 42 extending from the base 41 are provided. Any of various methods, for example, injection molding, or the like can be applied to the manufacturing of the bonding intermediating member 40.

Figure 6A:
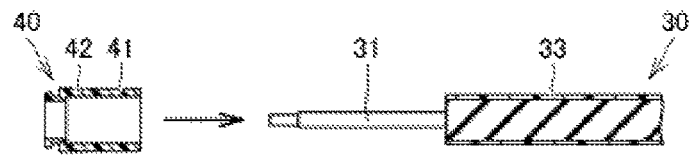
FIGS. 6(A) to 6(E) show an assembly diagram for describing the manufacturing method of the proximity sensor according to Embodiment 1 of the present invention.

Next, the bonding intermediating member 40 is joined to the cable 30 as shown in FIG. 5 and FIG. 6(A) (Step ST12). More specifically, the bonding intermediating member 40 is joined to the cable 30 when the base 41 of the bonding intermediating member 40 is press-fitted to the end of the sheath 33 of the cable 30. Accordingly, the base 41 covers an outer circumferential face of the sheath 33 at the end thereof and the extension part 42 is positioned to extend from the base 41.

Figure 6B:
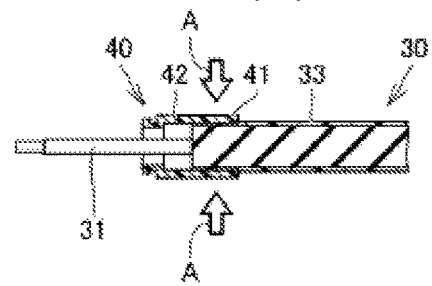

Next, the bonding intermediating member 40 is welded onto the cable 30 as shown in FIG. 5 and FIG. 6(B) (Step ST13). More specifically, the portion of the base 41 which is press-fitted into the sheath 33 (i.e., the portion indicated by arrow A in FIG. 6(B)) is thermally welded by applying heat to the portion from outside. Note that welding using laser radiation or the like as well as thermal welding using heat conduction can be used for the welding.

Figure 6C:
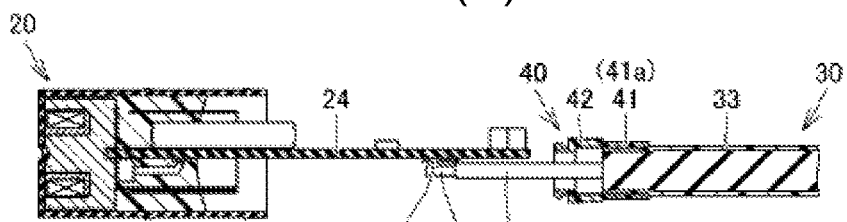

Next, the cable 30 is connected to the detector assembly 20 as shown in FIG. 5 and FIG. 6(C) (Step ST14). More specifically, the conductive wire 31a exposed from the cable 30 is disposed to face the land 24a of the circuit board 24 and then the conductive wire and the land are soldered in that state.

Figure 6D:
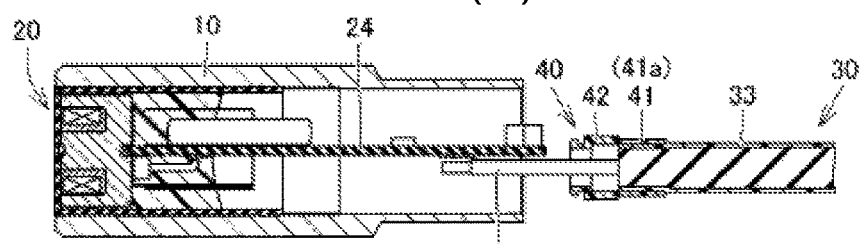

Next, the detector assembly 20 is assembled into the case 10 as shown in FIG. 5 and FIG. 6(D) (Step ST15). More specifically, the detector assembly 20 is assembled into the case 10 by press-fitting the detector assembly 20 into the front end of the case 10.

Figure 6E:
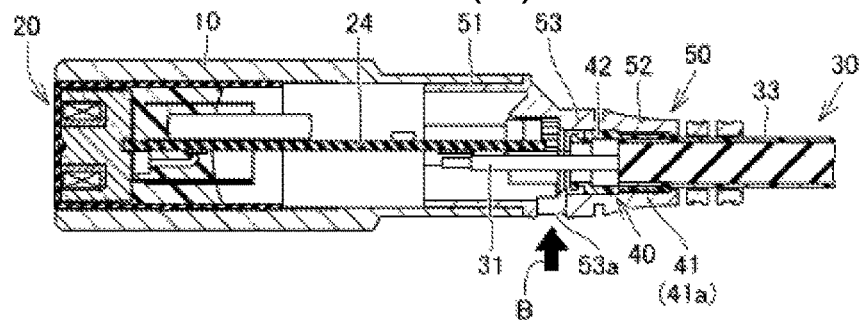

Next, the clamp 50 is assembled into the case 10 and the bonding intermediating member 40 as shown in FIG. 5 and FIG. 6(E) (Step ST16). More specifically, the fixing part 51 of the clamp 50 is press-fitted into the opening at the rear end of the case 10, the bonding intermediating member 40 is press-fitted into the rear end of the clamp 50, and thereby the clamp 50 is assembled into the case 10 and the bonding intermediating member 40.

Next, a liquid resin is injected into the case 10 and the clamp 50 and is cured as shown in FIG. 5 (Step ST17). More specifically, a liquid resin is injected from the part indicated by arrow B in FIG. 6(E) through the gate 53a of the clamp 50, then the liquid resin is cured, and thereby the proximity sensor 1A having the above-described configuration is obtained.

Note that, although the case in which the bonding intermediating member 40 is welded onto the cable 30 after the bonding intermediating member 40 is joined to the cable 30 and before the cable 30 is connected to the detector assembly 20 has been exemplified above, the bonding intermediating member 40 may be welded onto the cable 30 after the cable 30 is connected to the detector assembly 20 or after the detector assembly 20 is assembled into the case 10. That is to say, Step ST13 may be performed between Step ST14 and Step ST15 or between Step ST15 and Step ST16.

Furthermore, although the case in which the detector assembly 20 is assembled into the case 10 after the cable 30 is connected to the detector assembly 20 and before the clamp 50 is assembled into the case 10 and the bonding intermediating member 40 has been exemplified above, the detector assembly 20 may be assembled into the case 10 before the cable 30 is connected to the detector assembly 20. That is to say, Step ST15 may be performed prior to Step ST14.

In the manufacturing method of the proximity sensor according to the present embodiment, the bonding intermediating member 40 that is made of a resin is welded onto the cable 30 and fixed thereto in order to improve a bonding force between the second sealing resin part 60 and the cable 30 as described above, which simplifies manufacturing, and thus an effect of reducing manufacturing costs can be obtained, and an effect of widening a range of materials for various resin components selected to improve environmental resistance can be obtained.

Figures 7A, 7B:
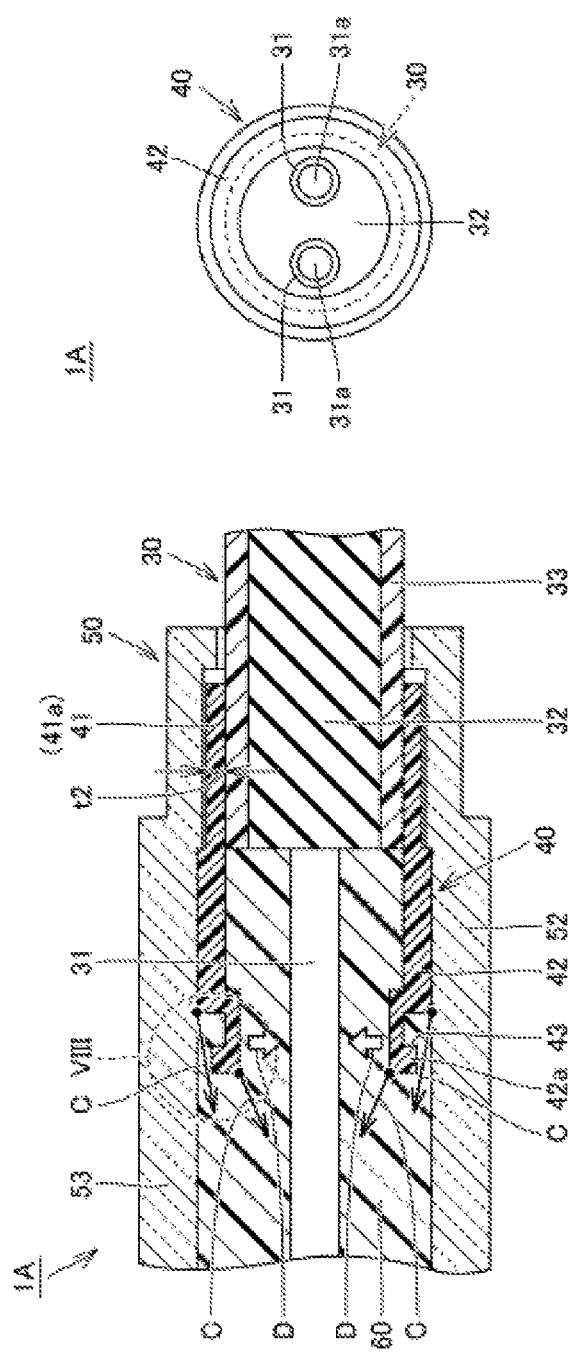
FIGS. 7(A) and 7(B) show a schematic cross-sectional view for describing the reason for a strong bonding force that can be secured at a connection section of a cable and a case and a front view of the cable to which the bonding intermediating member is fixed in the proximity sensor of Embodiment 1 of the present invention.
Figure 8:
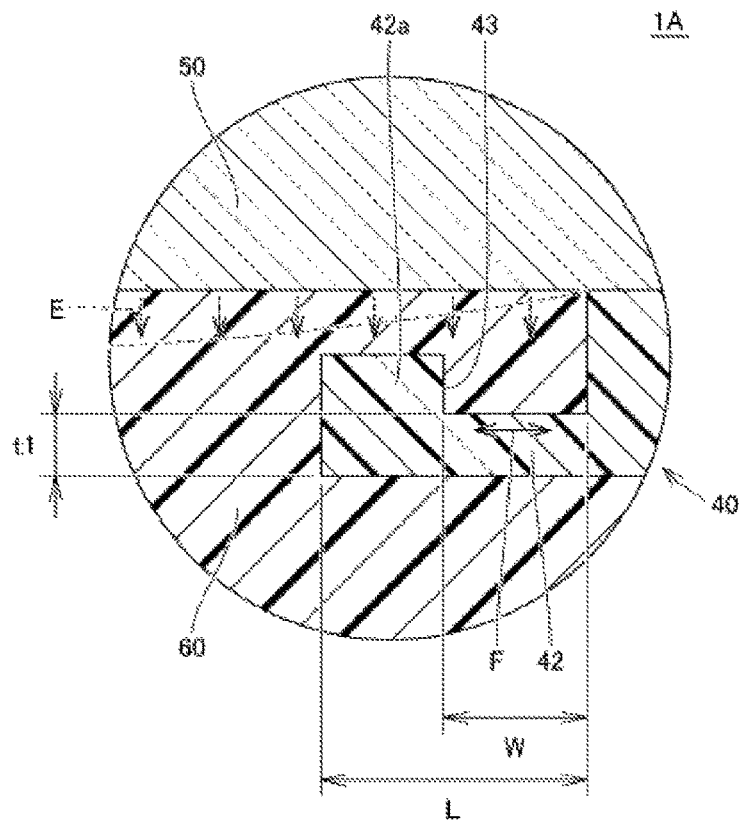
FIG. 8 is an enlarged cross-sectional view of area VIII shown in FIG. 7.

FIG. 7(A) and FIG. 7(B) each are schematic cross-sectional view for describing the reason for there being a strong bonding force that can be secured at the connection section of the cable with respect to the case and a front view of the cable to which the bonding intermediating member is fixed in the proximity sensor according to the present embodiment. In addition, FIG. 8 is an enlarged cross-sectional view of area VIII shown in FIG. 7(A). Next, the reason for the strong bonding force secured in the proximity sensor 1A according to the present embodiment will be described with reference to FIGS. 7 and 8. Note that the clamp 50 is depicted to have a simplified configuration in FIG. 7(A) in order to facilitate understanding.

In the proximity sensor 1A according to the present embodiment, the substantially cylindrical extension part 42 that is configured to be sufficiently thin and positioned protruding from the end of the sheath 33 is provided in the bonding intermediating member 40 that is provided to cover the end of the sheath 33 of the cable 30, and the inner circumferential face and the outer circumferential face of the extension part 42 at the tip side and the end face at the tip side of the extension part 42 in the axial direction are all covered by the second sealing resin part 60 as described above with reference to FIG. 7(A) and FIG. 7(B).

With the above-described configuration, firstly, residual stress created during the curing of the second sealing resin part 60 can be reduced. This is because an amount of resin of the second sealing resin part 60 placed in the end of the second sealing resin part 60 on the bonding intermediating member 40 side decreases to the extent of the extension part 42.

Thus, a strong bonding force can be maintained inversely proportional to the reduction of the residual stress, and as a result, the strong bonding force can be secured at the connection section of the cable 30 with respect to the case 10.

In addition, secondly, when the second sealing resin part 60 expands and contracts in accordance with changes of environment temperature, a tracking property of the extension part 42 can be obtained. This is because the portion of the extension part 42 at the tip side tracks the expansion and contraction of the second sealing resin part 60 and thus is elastically deformed due to the thin thickness of the portion of the extension part 42 at the tip side.

More specifically, when the second sealing resin part 60 contracts, great local stress is exerted on ends of the interface between the bonding intermediating member 40 and the second sealing resin part 60 as indicated by arrows C in FIG. 7(A). At this time, however, the portion of the extension part 42 at the tip side tracks the contraction and is elastically deformed in the directions of arrows D shown in the drawing, which dramatically alleviates the stress exerted on the ends, and thus separation occurring on the interface can be suppressed.

Thus, the strong bonding force can be maintained according to an amount by which the stress exerted on the interface between the bonding intermediating member 40 and the second sealing resin part 60 is reduced when the second sealing resin part 60 expands and contracts, and as a result, a strong bonding force at the connection section of the cable 30 with respect to the case 10 can be secured.

Adoption of the above-described structure allows materials of the bonding intermediating member 40 and the second sealing resin part 60 to be selected in a wide range, and thus an effect that various restrictions on manufacturing are reduced can also be exhibited by adopting the proximity sensor 1A according to the present embodiment.

In addition, the groove 43 extending on the outer circumferential face of the portion of the extension part 42 at the tip side in the circumferential direction as described above is provided in the proximity sensor 1A according to the present embodiment as shown in FIG. 7(A) and FIG. 8. This configuration helps the above-described so-called anchoring effect be obtained.

More specifically, when the second sealing resin part 60 contracts in accordance with a change of an environment temperature as shown in FIG. 8, the contraction occurs around an outer circumferential face of the second sealing resin part 60 that is the contact face with respect to the clamp 50 in the direction indicated by arrows E of the drawing and accordingly shear stress occurs on the interface between the bonding intermediating member 40 and the second sealing resin part 60 in the direction indicated by arrow F of the drawing. However, the shear stress can be stopped from reaching a tip 42a of the extension part 42 since the groove 43 is positioned on the outer circumferential face of the extension part 42, and as a result, occurrence of separation of the interface can be suppressed.

As described above, since the strong bonding force can be secured at the connection section of the cable 30 with respect to the case 10 by adopting the proximity sensor 1A according to the present embodiment, it is possible to effectively stop damage such as separation from occurring in the section, and as a result, a proximity sensor having excellent environmental resistance can be obtained.

Note that a thickness t1 of a thinnest portion of the cylindrical extension part 42 is preferably set to a value in the range of 0.3 mm to 0.5 mm with reference to FIG. 8.

More specifically, the thickness t1 preferably includes a portion having a thickness in the range of 0.3 mm to 0.5 mm in the circumferential direction of the cylindrical extension part 42. Elasticity and stiffness of the extension part 42 are appropriately adjusted due to the above-described configuration, and thus the above-described tracking property can be obtained more reliably. However, a thickness of the extension part 42 is not particularly limited thereto.

In addition, a length L of the portion of the extension part 42 at the tip side in the axial direction is preferably set to a value greater than or equal to 0.5 mm. Elasticity and stiffness of the extension part 42 are appropriately adjusted by setting the length L thereof in the axial direction to a value greater than or equal to 0.5 mm, and thus the above-described tracking property can be obtained more reliably. However, a length of the portion of the extension part 42 at the tip side in the axial direction is not particularly limited thereto.

Furthermore, a width W of the groove 43 is preferably set to a value greater than or equal to 0.5 mm. Elasticity and stiffness of the extension part 42 are appropriately adjusted by setting the width W to a value greater than or equal to 0.5 mm, and thus the above-described tracking property can be obtained more reliably. However, a width of the groove 43 is not particularly limited thereto.

In addition, although the case in which the groove 43 extending on the outer circumferential face of the portion of the extension part 42 at the tip side in the circumferential direction in the proximity sensor 1A according to the present embodiment has been exemplified as described above, an uneven part having a different shape from the groove may be provided on one of the outer circumferential face and the inner circumferential face of the extension part 42 or both, and a hole that penetrates the extension part 42 in a radial direction, or any of various types of notches may be provided in the extension part 42. The above-described anchoring effect can be obtained as well in the above-described configuration.

Moreover, although the case in which the extension part 42 has a substantially cylindrical shape in the proximity sensor 1A according to the present embodiment as described above has been exemplified, the extension part 42 needs not to be cylindrical, and an outer shape of the extension part 42 may not necessarily be cylindrical even when the extension part is cylindrical, and may be, for example, a polygonal cylindrical shape or an oval cylindrical shape.

In addition, for the proximity sensor 1A according to the present embodiment, a material of the second sealing resin part 60 is preferably selected from an epoxy resin and a PUR resin, a material of the bonding intermediating member 40 is preferably selected from a PBT resin, a PUR resin, a nylon-based resin, and a fluorine-based resin, and a material of the sheath 33 is preferably selected from a PVC resin, a PUR resin, and a fluorine-based resin as described above.

Furthermore, when a fluorine-based resin is selected for a material of the bonding intermediating member 40 and a fluorine-based resin is likewise selected for a material of the sheath 33, very high oil resistance can be obtained. Thus, it is preferable to use a combination of these materials for a proximity sensor used in an environment in which a large amount of oil such as cutting oil is used.

Here, a fluorine-based resin is a material inappropriate for insert molding, and thus when a fluorine-based resin is used for a material of the bonding intermediating member 40, it is not easy to manufacture the member through insert molding. In order to overcome this problem, the bonding intermediating member 40 can be manufactured in advance as a separate component and joined to the cable 30 to be fixed thereto through welding in the manufacturing method of the proximity sensor according to the present embodiment, and therefore, the bonding intermediating member 40 can be relatively easily made of a fluorine-based resin.

Here, welding can be easily performed when a difference between melting points of members to be bonded to each other is normally in a range equal to or lower than approximately 50°. Thus, it is necessary to select materials considering this point when the materials are to be selected.

Note that a thickness t2 of the welded part 41a of the bonding intermediating member 40 that is formed by welding the bonding intermediating member 40 onto the sheath 33 shown in FIG. 7 needs to be set considering a sealing property of the welded part. Thus, a thickness of the portion of the base 41 that will be the welded part 41a before the welding is preferably set to a value in a range of approximately 0.3 mm to 0.5 mm.

In addition, although the case in which the base 41 of the bonding intermediating member 40 is fixed to the end of the sheath 33 positioned at the one end side of the cable 30 as described above has been exemplified in the present embodiment, it is not necessary to adopt this configuration, and the base may be fixed to the sheath 33 at a position away from the end of the sheath 33. That is to say, the bonding intermediating member may have the cylindrical base covering the outer circumferential face of the sheath and the extension part extending from the base toward the one end side of the cable and bonding to the sealing resin part, and a positional relationship between the end of the sheath and the base and a positional relation between the end of the sheath and the extension part can be variously modified.

Modification 1

Figure 9:
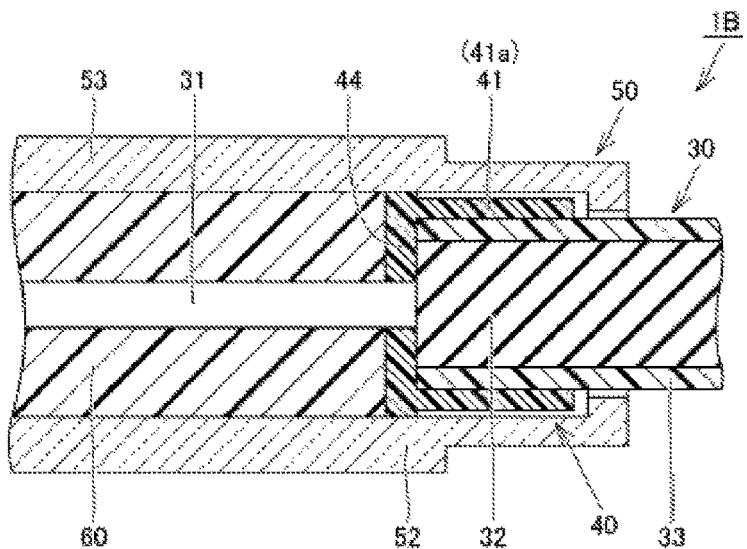
FIG. 9 is an enlarged cross-sectional view of a main section of a proximity sensor according to Modification 1.

FIG. 9 is an enlarged cross-sectional view of a main section of a proximity sensor according to Modification 1 on the basis of above-described Embodiment 1. The proximity sensor 1B according to Modification 1 will be described below with reference to FIG. 9.

As shown in FIG. 9, the proximity sensor 1B according to Modification 1 is different from the proximity sensor 1A according to above-described Embodiment 1 in that the bonding intermediating member 40 does not have the cylindrical extension part 42 but has a lid-like extension part 44 covering end faces of the sheath 33 and the shielding material 32 instead. Here, the bonding intermediating member 40 having the lid-like extension part 44 is fixed to the cable 30 through welding as in the above-described Embodiment 1.

While the proximity sensor 1B configured as described above is inferior to the proximity sensor 1A according to above-described Embodiment 1 in terms of reduction of residual stress created during curing of the second sealing resin part 60 and a tracking property of the extension part 42 when the second sealing resin part 60 expands and contracts in accordance with changes of environment temperature, the modification as well as above-described Embodiment 1 is superior to the related art in terms of a reduction in manufacturing costs resulting from the simplified manufacturing and an increase in a degree of freedom in selecting materials.

Modification 2

Figure 10:
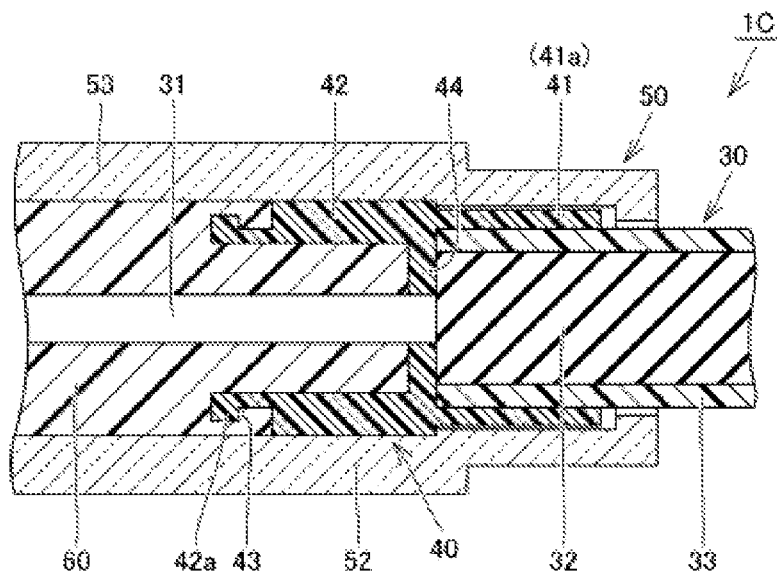
FIG. 10 is an enlarged cross-sectional view of a main section of a proximity sensor according to Modification 2.

FIG. 10 is an enlarged cross-sectional view of a main section of a proximity sensor according to Modification 2 based on the present embodiment. The proximity sensor 1C according to Modification 2 will be described below with reference to FIG. 10.

The proximity sensor 1C according to Modification 2 is different from the proximity sensor 1A according to above-described Embodiment 1 in view of a point that the bonding intermediating member 40 further has the lid-like extension part 44 that covers end faces of the sheath 33 and the shielding material 32 in addition to the base 41 and the cylindrical extension part 42 as shown in FIG. 10. Here, the bonding intermediating member 40 having the cylindrical extension part 42 and the lid-like extension part 44 is fixed to the cable 30 through welding as in the above-described Embodiment 1.

The proximity sensor 1C configured as above is excellent like that of above-described Embodiment 1 in terms of a reduction of residual stress created during curing of the second sealing resin part 60 and a tracking property of the extension part 42 when the second sealing resin part 60 expands and contracts in accordance with changes of environment temperature, and is superior to the related art in terms of a reduction in manufacturing costs resulting from the simplified manufacturing and an increase in a degree of freedom in selecting materials.

Modification 3

Figure 11:
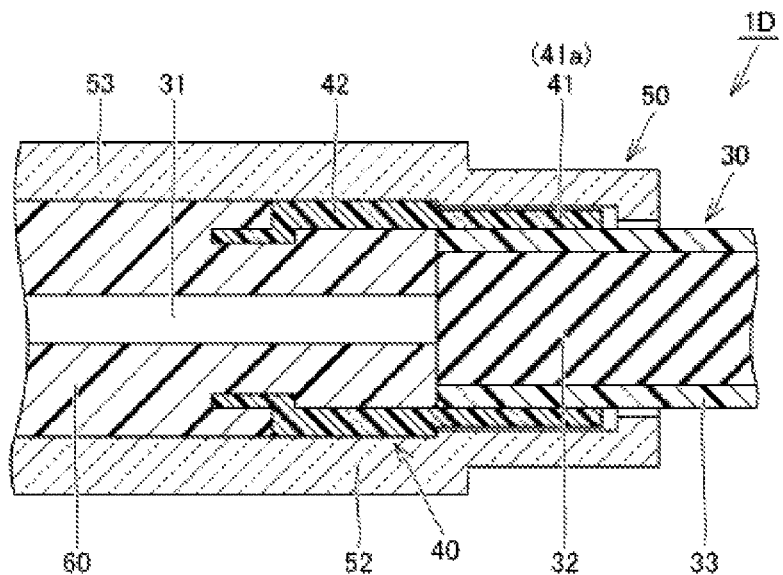
FIG. 11 is an enlarged cross-sectional view of a main section of a proximity sensor according to Modification 3.

FIG. 11 is an enlarged cross-sectional view of a main section of a proximity sensor according to Modification 3 on the basis of above-described Embodiment 1. The proximity sensor 1D according to Modification 3 will be described below with reference to FIG. 11.

The proximity sensor 1D according to Modification 3 is different from the proximity sensor 1A according to above-described Embodiment 1 only in that the groove 43 is not provided in the cylindrical extension part 42 of the bonding intermediating member 40 as shown in FIG. 11. Here, the bonding intermediating member 40 having the cylindrical extension part 42 is fixed to the cable 30 using welding as in the above-described Embodiment 1.

The proximity sensor 1D configured as above is excellent like that of above-described Embodiment 1 in terms of a reduction of residual stress created during curing of the second sealing resin part 60 and a tracking property of the extension part 42 when the second sealing resin part 60 expands and contracts in accordance with changes of environment temperature, and is superior to the related art in terms of a reduction in manufacturing costs resulting from the simplified manufacturing and an increase in a degree of freedom in selecting materials.

Modification 4

Figure 12:
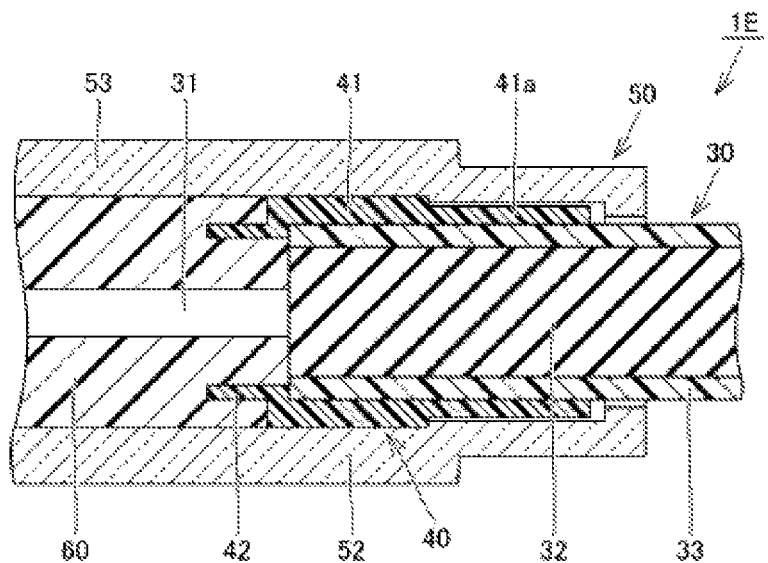
FIG. 12 is an enlarged cross-sectional view of a main section of a proximity sensor according to Modification 4.

FIG. 12 is an enlarged cross-sectional view of a main section of a proximity sensor according to Modification 4 based on the present embodiment. The proximity sensor 1E according to Modification 4 will be described below with reference to FIG. 12.

The proximity sensor 1E according to Modification 4 is different from the proximity sensor 1D according to above-described Modification 3 in that the welded part 41a is provided only at the rear end of the base 41 of the bonding intermediating member 40 and the welded part 41a does not constitute the entire base 41 as shown in FIG. 12. Here, the bonding intermediating member 40 having the cylindrical extension part 42 is fixed to the cable 30 using welding as in the above-described Embodiment 1.

The proximity sensor 1E configured as above is excellent like that of above-described Embodiment 1 in terms of a reduction of residual stress created during curing of the second sealing resin part 60 and a tracking property of the extension part 42 when the second sealing resin part 60 expands and contracts in accordance with changes of environment temperature, and is superior to the related art in terms of a reduction in manufacturing costs resulting from the simplified manufacturing and an increase in a degree of freedom in selecting materials.

Modification 5

Figure 13:
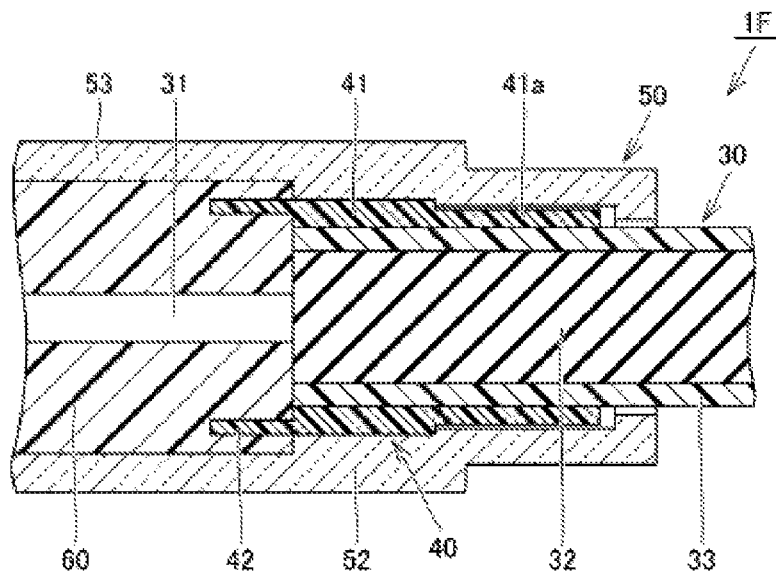
FIG. 13 is an enlarged cross-sectional view of a main section of a proximity sensor according to Modification 5.

FIG. 13 is an enlarged cross-sectional view of a main section of a proximity sensor according to Modification 5 based on the present embodiment. The proximity sensor 1F according to Modification 5 will be described below with reference to FIG. 13.

The proximity sensor 1F according to Modification 5 is different from the proximity sensor 1E according to above-described Modification 4 in that the base 41 and the cylindrical extension part 42 of the bonding intermediating member 40 have substantially the same-sized outer shape and accordingly the inner diameter of the portion of the clamp 50 corresponding to the cylindrical extension part 42 becomes greater than the inner diameter of the portion of the clamp 50 corresponding to the base 41 as shown in FIG. 13.

The proximity sensor 1F configured as above is excellent like that of above-described Embodiment 1 in terms of a reduction of residual stress created during curing of the second sealing resin part 60 and a tracking property of the extension part 42 when the second sealing resin part 60 expands and contracts in accordance with changes of environment temperature, and is superior to the related art in terms of a reduction in manufacturing costs resulting from the simplified manufacturing and an increase in a degree of freedom in selecting materials.

Embodiment 2

Figure 14:
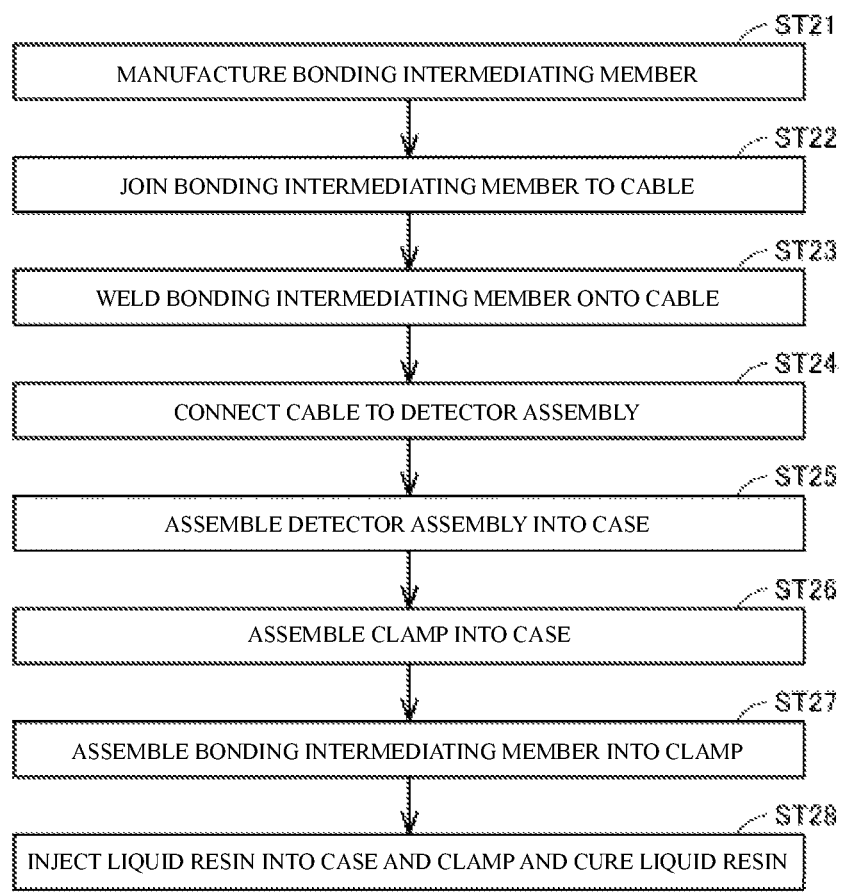
FIG. 14 is a flowchart for describing a manufacturing method of a proximity sensor according to Embodiment 2 of the present invention.

FIGS. 14 and 15 each are a flowchart and an assembly diagram for describing a manufacturing method of a proximity sensor according to Embodiment 2 of the present invention. The manufacturing method of a proximity sensor according to the present embodiment will be described below with reference to FIGS. 14 and 15.

Note that, since the manufacturing method of the proximity sensor according to the present embodiment is slightly different from the manufacturing method of the proximity sensor 1A according to above-described Embodiment 1 as will be described below, a shape thereof is accordingly slightly different as well. However, since a specific form of the proximity sensor is roughly clarified in the assembly diagram of FIG. 15, illustration of the assembly is omitted here.

First, the bonding intermediating member 40 is manufactured (Step ST21), then the bonding intermediating member 40 is joined to the cable 30 (Step ST22), then the bonding intermediating member 40 is welded onto the cable 30 (Step ST23), then the cable 30 is connected to the detector assembly 20 (Step ST24), and then the detector assembly 20 is assembled into the case 10 (Step ST25) as indicated in FIG. 14. Note that, since details of Steps ST21 to ST25 are similar to Steps ST11 to ST15 described in FIG. 5 above, description thereof is not repeated here.

Figure 15A:
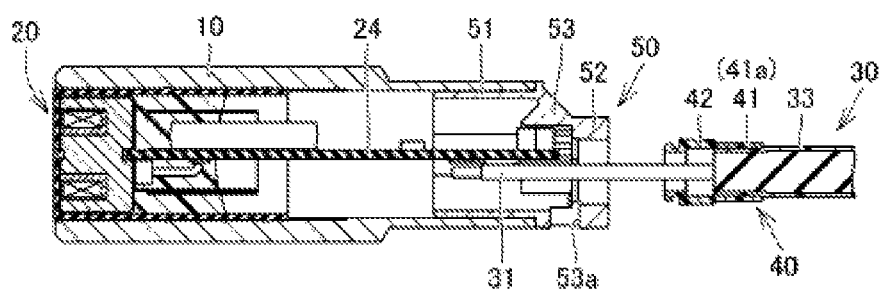
FIGS. 15(A) and 15(B) are an assembly diagram for describing the manufacturing method of the proximity sensor according to Embodiment 2 of the present invention.

Next, the clamp 50 is assembled into the case 10 as shown in FIG. 14 and FIG. 15(A) (Step ST26). More specifically, the fixing part 51 of the clamp 50 is press-fitted into the opening at the rear end side of the case 10.

Figure 15B:
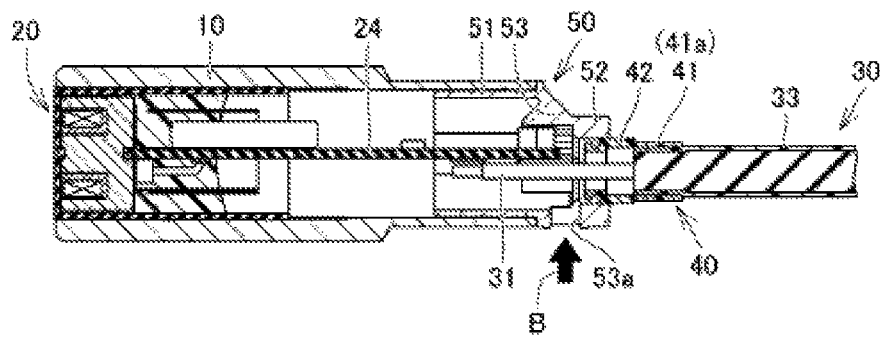

Next, the bonding intermediating member 40 is assembled into the clamp 50 as shown in FIG. 14 and FIG. 15(B) (Step ST27). More specifically, the base 41 of the bonding intermediating member 40 is press-fitted into the rear end of the clamp 50 and thereby the clamp 50 is assembled on the bonding intermediating member 40.

Next, a liquid resin is injected into the case 10 and the clamp 50 and cured as indicated in FIG. 14 (Step ST28). Note that, since details of Step ST28 are similar to those of Step ST17 indicated in the above-described FIG. 5, description thereof is not repeated here. Accordingly, the proximity sensor according to the present embodiment equivalent to the proximity sensor 1A according to above-described Embodiment 1 is obtained.

Note that, although the case in which the bonding intermediating member 40 is welded onto the cable 30 after the bonding intermediating member 40 is joined to the cable 30 and before the cable 30 is connected to the detector assembly 20 has been exemplified in the above description, the bonding intermediating member 40 may be welded onto the cable 30 at any timing after the cable 30 is connected to the detector assembly 20 before a proximity sensor is completed. That is to say, Step ST23 may be performed after any step from Steps ST24 to ST28 as long as it is performed after Step ST24.

Furthermore, although the case in which the detector assembly 20 is assembled into the case 10 after the cable 30 is connected to the detector assembly 20 and before the clamp 50 is assembled into the case 10 has been exemplified above, the detector assembly 20 may be assembled into the case 10 before the detector assembly 20 is connected to the cable 30. That is to say, Step ST25 may be performed before Step ST24.

The proximity sensor according to the above-described present embodiment is excellent like that of above-described Embodiment 1 in terms of a reduction of residual stress created during curing of the second sealing resin part 60 and a tracking property of the extension part 42 when the second sealing resin part 60 expands and contracts in accordance with changes of environment temperature, and is superior to the related art in terms of a reduction in manufacturing costs resulting from the simplified manufacturing and an increase in a degree of freedom in selecting materials.

Although the case in which the composite cable with the shielding material is used as a cable drawn out from the case has been exemplified in the above-described Embodiments 1 and 2 of the present invention and modifications thereof, any of various cables may be used as the cable, and the present invention can also be applied to, for example, a composite cable not including the above-described shielding material or a cable only constituted by a conductive wire and a sheath covering the wire (a so-called lead wire, or the like).

Furthermore, although the case in which the internal space defined by the case and the clamp is filled with the first sealing resin part and the second sealing resin part has been exemplified in the above-described Embodiments 1 and 2 of the present invention and modifications thereof, the invention may not necessarily be configured as above, and the space may be filled with only a single sealing resin part.

In addition, although the case in which the bonding intermediating member is constituted by a single component has been exemplified in the above-described Embodiment 1 and 2 of the present invention and modifications thereof, the bonding intermediating member may be constituted by a plurality of components or by a two-color molding member.

Furthermore, although the case in which the present invention is applied to a proximity sensor has been exemplified in the above-described Embodiment 1 and 2 of the present invention and modifications thereof, the invention can of course be applied to sensors other than proximity sensors and various electronic apparatuses other than sensors.

The embodiments and modifications thereof disclosed as above are merely examples in all aspects and are not limitative. The technical scope of the present invention is demarcated by the claims and includes all modifications having the gist equivalent to that of the claims within the scope thereof.

What is claimed is:

1. A manufacturing method of an electronic apparatus that comprises a case having an opening; an electronic component housed in the case; a cable whose one end is inserted into the opening to be electronically connected to the electronic component and the other end is drawn out to outside; a bonding intermediating member that is made of a resin and joined to the cable; a cylindrical clamp that fits into the opening and holds the cable when the bonding intermediating member fits into the cylindrical clamp; and a sealing resin part that fills an internal space defined by the case and the cylindrical clamp, the method comprising:
    a step of manufacturing the bonding intermediating member so as to have a cylindrical base and a cylindrical extension part extending from the cylindrical base;
    a step of joining the bonding intermediating member to the one end side of the cable so that an outer circumferential face of a sheath is covered by the cylindrical base and the cylindrical extension part extends from the cylindrical base toward the one end side of the cable;
    a step of fixing the bonding intermediating member to the cable by welding the cylindrical base onto the sheath; and
    a step of filling the internal space defined by the case and the cylindrical clamp with the sealing resin part to bond the sealing resin part to the cylindrical extension part of the bonding intermediating member, wherein an inner circumferential face and an outer circumferential face of the cylindrical extension part at a tip side and an end face at the tip side of the cylindrical extension part in an axial direction are all covered by the sealing resin part, and an inner circumferential face of the cylindrical base is completely in physical contact with the outer circumferential face of the sheath.

2. The manufacturing method of the electronic apparatus according to claim 1, wherein a thickness of a portion of the cylindrical base to be welded onto the sheath before the welding is a value in the range of 0.3 mm to 0.5 mm.

3. The manufacturing method of the electronic apparatus according to claim 1,
    wherein the sealing resin part is formed of one of an epoxy resin and a polyurethane resin,
    the bonding intermediating member is formed of one of a polybutylene terephthalate resin, a polyurethane resin, a nylon-based resin, and a fluorine-based resin, and
    the sheath is formed of one of a polyvinyl chloride resin, a polyurethane resin, and a fluorine-based resin.

4. An electronic apparatus comprising:
    a case having an opening;
    an electronic component housed in the case;
    a cable whose one end is inserted into the opening to be electronically connected to the electronic component and the other end is drawn out to outside;

a bonding intermediating member that is made of a resin and joined to the cable;
a cylindrical clamp that fits into the opening and holds the cable when the bonding intermediating member fits into the cylindrical clamp; and
a sealing resin part that fills an internal space defined by the case and the cylindrical clamp,
wherein the cable has a core wire comprising a conductive wire and a sheath that is made of a resin covering the core wire,
the core wire is exposed at the one end side of the cable without being covered by the sheath,
the bonding intermediating member has a cylindrical base covering an outer circumferential face of the sheath and a cylindrical extension part extending from the cylindrical base toward the one end side of the cable and being bonded to the sealing resin part, wherein an inner circumferential face and an outer circumferential face of the cylindrical extension part at a tip side and an end face at the tip side of the cylindrical extension part in an axial direction are all covered by the sealing resin part, an inner circumferential face of the cylindrical base is completely in physical contact with the outer circumferential face of the sheath, and
the bonding intermediating member is fixed to the cable by welding the cylindrical base onto the sheath.

5. The electronic apparatus according to claim 4,
wherein the sealing resin part is formed of one of an epoxy resin and a polyurethane resin,
the bonding intermediating member is formed of one of a polybutylene terephthalate resin, a polyurethane resin, a nylon-based resin, and a fluorine-based resin, and
the sheath is formed of one of a polyvinyl chloride resin, a polyurethane resin, and a fluorine-based resin.

* * * * *